United States Patent

Van Hoof et al.

[15] 3,660,147
[45] May 2, 1972

[54] ADHESIVE TAPE

[72] Inventors: Albert Emiel Van Hoof, Berchem; Georges Arthur Holvoet, Mortsel, both of Belgium

[73] Assignee: Gevaert-AGFA N.V., Mortsel, Belgium

[22] Filed: Apr. 12, 1967

[21] Appl. No.: 630,224

[30] Foreign Application Priority Data

Apr. 12, 1966 Great Britain ............... 16,078/66

[52] U.S. Cl. .............. 117/122 PA, 117/145, 117/155 UA, 117/161 UB
[51] Int. Cl. .............. C09j 7/02, C09j 7/04, D21h 1/38
[58] Field of Search ............... 117/122 P, 122 PA, 122 PF, 117/122 S, 161 UH, 161 U, 161 LN, 145, 155 UA, 161 UB; 260/33.2, 33.4, 615, 615 B

[56] References Cited

UNITED STATES PATENTS

| | | | |
|---|---|---|---|
| 1,922,459 | 8/1933 | Schmidt et al. | 260/615 X |
| 2,327,053 | 8/1943 | Marple et al. | 260/615 X |
| 2,450,079 | 9/1948 | Brown | 260/615 UX |
| 2,700,619 | 1/1955 | Sullivan et al. | 117/3.6 |
| 2,838,421 | 6/1958 | Sohl | 260/33.4 X |
| 3,096,202 | 7/1963 | Von Arx | 117/122 X |

Primary Examiner—William D. Martin
Assistant Examiner—Harry J. Gwinnell
Attorney—William J. Daniel

[57] ABSTRACT

An adhesive tape carrying a layer of a water-soluble adhesive composed of a homogeneous mixture of at least one water-soluble polymer and as an elasticizing agent a derivative of a polyol having at least three hydroxyl groups at least one of which is replaced by a hydroxyalkylene ether group, all of the hydroxyl groups of such derivative either remaining as free hydroxyl groups or being replaced by inert alkoxy groups. Preferably, the amount of the polyol derivative elasticizing agent is 25–100 percent by weight of the water-soluble polymer. The tape is characterized by tenacious adherence to surfaces of film or paper and removal with water.

4 Claims, No Drawings

ADHESIVE TAPE

The invention relates to an adhesive tape the adhesive layer of which is normally tacky in dry condition, adheres tenaciously to a surface when the tape is pressed thereagainst and is water-soluble.

In the photographic industry it very often occurs that rolls of film or paper must be spliced in order to make possible a continuous treatment thereof e.g., coating with one or more layers, cutting into sizes etc. For this purpose pressure-sensitive adhesive tapes that have a water-insoluble adhesive coating are generally used.

While the film or paper is worked up into the format desired for delivery, the parts adhering to each other (i.e., the spliced parts) must be picked out. They must not get mixed with the common waste film or waste paper intended for recuperation. In view of the recuperation of the base material of the photographic waste film or waste paper the said film or paper is first treated with warm water or warm aqueous solutions of acid or alkaline substances; the common adhesive tapes having water-insoluble adhesive layers are not removed by the water-treatment and would remain in the recuperated film or paper as an undesirable and interfering element.

It has been proposed to use adhesive tape the adhesive of which is water-soluble and consists of a mixture of a water-soluble polyvinyl carboxylic acid and a hydroxy-polyalkylene. However, the adhesive power of layers with this composition is insufficient for some applications.

According to the invention a tape has been found that tenaciously adheres to the surface of film or paper by simply pressing it thereagainst, the water-soluble adhesive layer of which consists of a homogeneous mixture of at least one water-soluble polymer and as elasticizer at least one hydroxyalkylene ether of a polyol with three or more hydroxyl groups.

When a water-soluble adhesive according to the invention is coated e.g., on a cellulose triacetate support the adhesive tape obtained can be used for splicing rolls of cellulose triacetate film carrying either or not a photographic silver halide emulsion layer, a gelatin backing layer etc. Films that are spliced by means of adhesive tape according to the invention can now undergo the recuperation treatment directly without leaving interfering elements.

Photographic films with other kinds of supports such as cellulose acetobutyrate supports, cellulose nitrate supports, polyester supports etc. or photographic papers can also be spliced by means of adhesive tape according to the invention and these spliced materials show the same advantages. It should be taken care, however, that the support of the adhesive tape is similar to that of the photographic material to be spliced.

Since in general in most of the combinations no chemical reaction takes place in the adhesive between the polymeric binder and the water-soluble elasticizer the adhesive remains completely water-soluble. However, there is danger that for certain combinations of polymeric binder and elasticizer, and in certain circumstances of temperature and/or humidity, yet a chemical reaction would occur. Hereby the adhesive power of the mixture and also the water-solubility would be impaired. This can be remedied by blocking the terminal hydroxy groups of the elasticizer molecules, e.g., by a common alkylating reaction, whereby these terminal hydroxy groups would be replaced, e.g., by methoxy groups.

When the tape is to be wound directly in roll form, a suitable liner is used such as a film of polyethylene or a paper coated on one or both sides with a silicon resin or with polyethylene in order to prevent bonding together of adjacent convolutions of the adhesive tape.

The water-soluble adhesive can be applied to the support from a solution in a volatile organic solvent or from an aqueous solution. By evaporation of the solvent an adhesive tape is obtained which is ready for immediate use.

The polymeric binder of the adhesive can be chosen from a whole series of polymers. The only restriction put on the polymers is that they must be water-soluble and compatible with the used hydroxyalkylene ether of the polyol. Suitable water-soluble polymers that can be used are e.g., polyvinylpyrrolidone polyacrylic acid, copolymers of maleic acid and e.g., ethylene, vinyl methyl ether and vinyl acetate, dimethylhydantoin-formaldehyde resin, polyethyleneimine etc.

Examples of suitable hydroxyalkylene ethers of poylols with three or more hydroxyl groups are the different hydroxypropyl ethers of glycerol, hydroxyethyl ethers of glycerol, hydroxypropyl ethers of glucose, hydroxypropyl ethers of sorbitol, tetrakis(hydroxypropyl) ether of pentaerythritol, octakis(2-hydroxypropyl) ether of sucrose. As mentioned hereinbefore, the terminal hydroxy groups of these hydroxyalkylene ethers or polyols can be blocked, e.g., by methoxy groups.

The ratio of the amount of polymeric binder present to the amount of elasticizer used can vary within very wide limits. Best results are attained, however, when the amount of elasticizer is from 25 to 120 percent by weight relative to the amount of polymeric binder present.

An aqueous or organic solution of the water-soluble polymer and hydroxyalkylene ether of a polyol with three or more hydroxyl groups according to the invention can also be used as glue for adhering paper to paper.

In the following examples the adhesive power of the adhesive tape is measured as follows :
the straight cut sides of 2 sheets of e.g., cellulose triacetate film provided with a photographic light-sensitive emulsion layer, are arranged in edge-to-edge relationship with the emulsion side turned upwards. A piece of the adhesive tape measuring 1.5 cm by 5 cm is pressed to the butt-end of one of the sheets and the tip portion of the other sheet both sheets being overlapped for 2.5 cm with tape. Both sheets are now put between the clamps of a Schopper dynamometer and the pulling force at which the pressure-sensitive tape gets loose is measured in kg.

The following examples illustrate the invention. Example 1
A solution with the following composition was prepared :

| | |
|---|---|
| dimethylhydantoin-formaldehyde resin | 30 g. |
| polyacrylic acid | 10 g. |
| di(2-hydroxypropyl)ether of glycerol | 12 g. |
| methanol | 130 cc. |

The solution is applied to a cellulose triacetate film in such a way that after evaporation of the solvent 17 g of solids remain per sq.m. When winding the material obtained into rolls a paper coated with silicone resin is interwound as liner within the successive convolutions of the tape.

The resulting adhesive tape can be used for splicing photographic films with cellulose triacetate film supports. The adhesive power of the adhesive layer measured as described above is about 16.5 kg.

EXAMPLE 2

A solution having the following composition :

| | |
|---|---|
| polyacrylic acid | 10 g. |
| di(2-hydroxypropyl)ether of glycerol | 9 g. |
| methanol | 90 cc. | is coated onto a cellulose triacetate film in such a way that 15 g of solids remain per sq.m.

The adhesive tape thus formed has an adhesive power of about 17.5kg when used as in example 1 for splicing photographic films with cellulose triacetate film supports.

EXAMPLE 3

A solution with the following composition :

| | |
|---|---|
| polyvinylpyrrolidone (mol.wgt.: about 360,000) | 10 g. |
| di(2-hydroxypropyl)ether of glycerol | 7 g. |
| ethanol | 90 cc. | is applied to a cellulose triacetate film in such a way that a layer having a solids content of 20 g/sq.m. remains.

The adhesive power of the adhesive tape thus formed is about 14 kg.

EXAMPLE 4

A solution prepared from:

| | |
|---|---|
| polyvinylpyrrolidone (mol.wgt. about 360,000) | 10 g. |
| di(2-hydroxypropyl)ether of glycerol | 10 g. |
| dimethylhydantoin-formaldehyde resin | 7 g. |
| isopropanol | 90 cc. | is coated onto a cellulose triacetate film in such a way that a layer of 20 g of solids per sq.m remains.

The adhesive power of the tape formed is about 14 kg.

EXAMPLE 5

A solution is formed having the following composition:

| | |
|---|---|
| polyvinylpyrrolidone (mol.wgt.: about 40,000) | 250 g. |
| polyvinylpyrrolidone (mol.wgt.: about 360,000) | 200 g. |
| di(2-hydroxypropyl)ether of glycerol | 400 g. |
| tri(2-hydroxyethyl)ether of glycerol | 90 g. |
| ethanol | 1000 cc. |
| methylene chloride | 2750 cc. |

The adhesive solution obtained is spread onto paper by means of a brush. After the evaporation of the solvents another paper is pressed on the adhesive layer. Both papers adhere to each other very strongly.

EXAMPLE 6

A solution is prepared having the following composition:

| | |
|---|---|
| polyvinylpyrrolidone (mol.wgt.:about 40,000) | 25 g. |
| polyvinylpyrrolidone (mol.wgt.:about 360,000) | 20 g. |
| octakis(2-hydroxypropyl)ether of sucrose | 40 g. |
| tri(2-hydroxyethyl)ether of glycerol | 18 g. |
| ethanol | 150 cc. |
| methylene chloride | 300 cc. |

The adhesive solution obtained is spread onto paper by means of a brush. After the evaporation of the solvents another paper is pressed on the adhesive layer. Both papers adhere to each other very strongly.

We claim:

1. An adhesive tape the water-soluble adhesive layer of which tenaciously adheres to the surface of film or paper when pressed thereagainst, characterized in that said water-soluble adhesive layer is composed of a homogeneous mixture of polyacrylic acid and as elasticizer a derivative of a polyol having at least three hydroxyl groups in which at least one of such hydroxyl groups is replaced by a hydroxyalkyleneoxy group, the hydroxyl groups in said derivative remaining as free hydroxyl groups or being replaced by methoxy groups.

2. An adhesive tape according to claim 1, wherein said elasticizer is present in the amount of 25 to 100 percent by weight relative to the weight of said water-soluble polymer.

3. An adhesive tape according to claim 1, wherein the elasticizer is the di(2-hydroxypropyl)ether of glycerol.

4. An adhesive tape according to claim 1, wherein the elasticizer is a mixture of the di(2-hydroxypropyl)ether and the tri(2-hydroxyethyl)ether of glycerol.

* * * * *